US 10,997,053 B2

(12) United States Patent
Dangi et al.

(10) Patent No.: US 10,997,053 B2
(45) Date of Patent: May 4, 2021

(54) GENERATING A DATA STREAM WITH CONFIGURABLE CHANGE RATE AND CLUSTERING CAPABILITY

(71) Applicant: EMC IP Holding Company LLC, Hopkinton, MA (US)

(72) Inventors: Salil Dangi, Mission Viejo, CA (US); Ernest Daza, Aliso Viejo, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/389,729

(22) Filed: Apr. 19, 2019

(65) Prior Publication Data
US 2020/0334130 A1    Oct. 22, 2020

(51) Int. Cl.
G06F 11/34    (2006.01)
G06F 11/36    (2006.01)

(52) U.S. Cl.
CPC ...... *G06F 11/3457* (2013.01); *G06F 11/3664* (2013.01)

(58) Field of Classification Search
None
See application file for complete search history.

(56) References Cited

U.S. PATENT DOCUMENTS

| | | | |
|---|---|---|---|
| 6,816,093 B1 | 11/2004 | Jaquette | |
| 8,223,673 B2 | 7/2012 | Miriyala et al. | |
| 10,038,733 B1 | 7/2018 | Dangi et al. | |
| 10,114,832 B1 | 10/2018 | Dangi et al. | |
| 10,114,850 B1 | 10/2018 | Dangi et al. | |
| 10,163,371 B1 | 12/2018 | Dangi et al. | |
| 10,235,134 B1 | 3/2019 | Dangi et al. | |
| 2006/0150229 A1 | 7/2006 | Blair | |
| 2012/0114310 A1 | 5/2012 | Hymel et al. | |
| 2014/0118541 A1 | 5/2014 | Lasko | |
| 2014/0279874 A1 | 9/2014 | Reiter | |
| 2016/0103757 A1* | 4/2016 | Liu | G06F 11/3082 717/130 |
| 2017/0220593 A1 | 8/2017 | Tripath et al. | |
| 2019/0034450 A1 | 1/2019 | Dangi et al. | |

FOREIGN PATENT DOCUMENTS

WO    2016137203    9/2016

OTHER PUBLICATIONS

U.S. Appl. No. 16/389,671, filed Apr. 19, 2019, Dangi et al.
U.S. Appl. No. 16/389,741, filed Apr. 19, 2019, Dangi et al.
U.S. Appl. No. 16/389,700, filed Apr. 19, 2019, Dangi et al.

(Continued)

*Primary Examiner* — Qing Chen
(74) *Attorney, Agent, or Firm* — Workman Nydegger

(57) ABSTRACT

One example method includes receiving a generation 0 data stream, creating and/or receiving a mask that includes multiple entries, each of which corresponds to a respective block of the generation 0 data stream, and each mask entry indicating a value n (0<=n<=desired generation N), identifying, in the mask, all non-zero entries, locating, in the generation 0 data stream, the blocks to which this entry corresponds to and based on the value n, modifying the generation 0 block to generate a generation N data stream.

20 Claims, 9 Drawing Sheets

(56) References Cited

OTHER PUBLICATIONS

International Search Report and Written Opinion issued in Application No. PCT/US2019/066632 dated Mar. 31, 2020.
International Search Report and Written Opinion for PCT/US2019/053878 dated Jan. 31, 2020.
Universal Mobile Telecommunications System; Multiplexing and channel coding; Technical Specification, European Telecommunications Standards Institute Sophia Antipolis Cedex. France, vol. 3-R1, No. V7.3.0 Dec. 1, 2006, XP014036328.
"Data Compression/Evaluating Compression Effectiveness" internet article, Feb. 21, 2017, XP002796742, accessed on Jan. 9, 2020 via: https://en.wikibooks.org/w/index.php?title=Data_Compression/Evaluating_Compression_Effectiveness&oldid=3184899.
U.S. Appl. No. 16/389,671, Jan. 8, 2020, Notice of Allowance.
ISR and WO issued in application No. PCT/2019/066632 dated Mar. 31, 2020.

* cited by examiner

| BASE (N=0) | DAY 2 (N=1) | DAY 3 (N=2) | DAY 4 (N=3) |
|---|---|---|---|
| 0000000000<br>0000000000<br>0000000000<br>0000000000<br>0000000000<br>0000000000<br>0000000000<br>0000000000<br>0000000000<br>0000000000 | 0000000000<br>0010000000<br>0000000000<br>0000000000<br>0000000000<br>0001000010<br>0000000000<br>0000000000<br>0010000000<br>0000000001 | 0000000200<br>0010000000<br>0000000000<br>0000000020<br>0000000000<br>0001000010<br>0002000000<br>0000000020<br>0010000000<br>0000200001 | 0000000200<br>0010030000<br>0000003000<br>0000000020<br>0030000000<br>0001000010<br>0002000000<br>0300000020<br>0010000003<br>0000200001 |
| 400a | 400b | 400c | 400d |

| DAY 5 (N=4) | DAY 6 (N=5) | DAY 7 (N=6) | DAY 8 (N=7) |
|---|---|---|---|
| 0000004020<br>0010030000<br>0000003000<br>0004040020<br>0030000000<br>0001000010<br>0002004000<br>0300000020<br>0010000403<br>0000200001 | 0005040200<br>0010030000<br>0000503000<br>0004040020<br>0030005000<br>0001000510<br>0002004000<br>0300500020<br>0010000403<br>0000200001 | 0005040200<br>0010030006<br>0000503000<br>0004040026<br>0030005000<br>0001060510<br>0002004000<br>0300506020<br>0010060403<br>0000200001 | 0005040200<br>0010030706<br>0000503070<br>0004040026<br>0030075000<br>0001060510<br>0002004000<br>0307506020<br>0010060403<br>0070200001 |
| 400e | 400f | 400g | 400h |

GENERATING A DATA STREAM WITH CONFIGURABLE CHANGE RATE AND CLUSTERING CAPABILITY

RELATED APPLICATIONS

This application is related to: U.S. Pat. No. 10,038,733 (Ser. No. 14/489,317, filed Sep. 17, 2014), entitled GENERATING A LARGE, NON-COMPRESSIBLE DATA STREAM, issued Jul. 31, 2018; U.S. Pat. No. 10,114,832 (Ser. No. 14/489,363, filed Sep. 17, 2014), entitled GENERATING A DATA STREAM WITH A PREDICTABLE CHANGE RATE, issued Oct. 30, 2018; U.S. Pat. No. 10,114,850 (Ser. No. 14/489,295, filed Sep. 17, 2014), entitled DATA STREAM GENERATION USING PRIME NUMBERS, issued Oct. 30, 2018; U.S. Pat. No. 10,235,134 (Ser. No. 15/420,614, filed Jan. 31, 2017), entitled ROTATING BIT VALUES WHILE GENERATING A LARGE, NON-COMPRESSIBLE DATA STREAM, issued Mar. 19, 2019; and, U.S. Pat. No. 10,163,371, (Ser. No. 15/420,633, filed Jan. 31, 2017), entitled ROTATING BIT VALUES BASED ON A DATA STRUCTURE WHILE GENERATING A LARGE, NON-COMPRESSIBLE DATA STREAM, issued Dec. 25, 2018. This application is also related to: United States Patent Application (Ser. No. 16/389,671), entitled GENERATING A DATA STREAM WITH CONFIGURABLE COMPRESSION, filed the same day herewith; United States Patent Application (Ser. No. 16/389,700), entitled GENERATING A DATA STREAM WITH CONFIGURABLE COMMONALITY, filed the same day herewith; and, United States Patent Application (Ser. No. 16/389,741), entitled GENERATING AND MORPHING A COLLECTION OF FILES IN A FOLDER/SUB-FOLDER STRUCTURE THAT COLLECTIVELY HAS DESIRED DEDUPABILITY, COMPRESSION, CLUSTERING AND COMMONALITY, filed the same day herewith. All of the aforementioned patents and applications are incorporated herein in their respective entireties by this reference.

FIELD OF THE INVENTION

Embodiments of the present invention generally relate to generation of data streams having various attributes. More particularly, at least some embodiments of the invention relate to systems, hardware, software, computer-readable media, and methods for generating data streams that change over time.

BACKGROUND

Developers and other personnel often have a need to simulate data streams that are generated by applications that are in a developmental stage. Simulation of the data streams enables the developer to identify and correct any problems, and enhance performance of the application, before the application is rolled out.

Various algorithms have been developed for generation of data streams. However data streams generated by these algorithms may be relatively narrow in terms of their applicability and usefulness. For example, data streams generated by such algorithms may not accurately reflect changes, and change rates, that occur in real world data streams.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 4 discloses some examples of block modification tables.

DETAILED DESCRIPTION OF SOME EXAMPLE EMBODIMENTS

Figure 1:
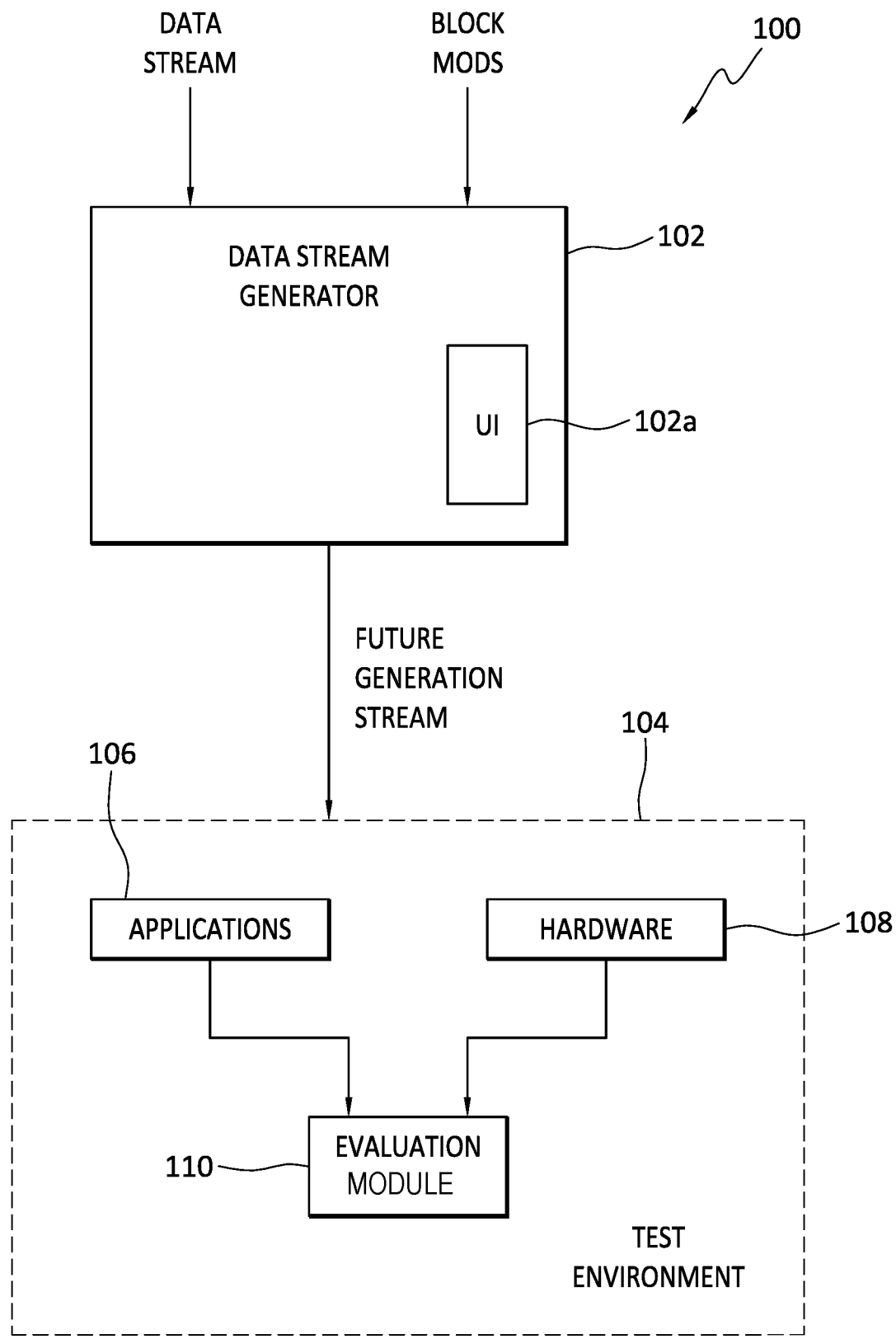
FIG. 1 discloses aspects of an example operating environment for some embodiments of the invention.

Embodiments of the present invention generally relate to generation of data streams having various attributes. More particularly, at least some embodiments of the invention relate to systems, hardware, software, computer-readable media, and methods for generating data streams that change over time.

More particularly, example embodiments of the invention may be employed in connection with various types of data streams including, for example, data streams that are non-deduplicatable, non-compressible, deduplicatable, or compressible, as well as combinations of these. Systems and methods for generating such data streams are disclosed in the Related Applications. Example embodiments of the present invention involve the use of a base data stream, and creation of future generations of the base data stream where, for example, a future generation of the base data stream may reflect changes not present in the base data stream and/or not present in one or more prior generations of the base data stream.

More particularly, example embodiments provide ways to generate, at a very high rate, such as 1 GBPS or higher, one or more future generations of a base data stream, where the future generation data streams have a desired change rate and clustering. In at least some embodiments, this is accomplished by simulating the blocks that will change in any specific generation of the base data stream, and remembering the latest generation of the data stream that altered that block, and using that input to alter the blocks as they are generated.

Example embodiments of the invention may also provide a relatively quick way to determine the blocks/areas that have changed between any two data stream generations, such as between generation M and generation N for example. This may be accomplished by generating the alteration table for generation M of the data stream and looking at all values that are above N.

Embodiments of the invention are effective in implementing a data stream alteration at specific locations in the data stream, by simulation in a specific way to achieve the desired change rate between data stream generations, and desired clustering in the data stream. The data stream simulation logic can inject changes in a future generation data stream in various ways. For example, the injected changes may be introduced in a clustered, uniform, random, or normalized, manner, or according to any other mathematical based probability distribution. Such changes may be injected, for example, by simulation logic of a simulation module.

Advantageously then, embodiments of the invention may provide various benefits and improvements relative to the configuration and operation of conventional hardware, software, systems and methods. For example, an embodiment of the invention implements simulation of data sets that change over time. Thus, the simulation can accurately reflect real world conditions in which data sets are not static but change with the passage of time. Further, an embodiment of the invention is able to provide a client with multiple different generations of a base data stream, depending upon the needs of the client. Moreover, the extent to which a particular future generation data stream varies with respect to the base stream and/or with respect to one or more other future generations can be readily selected and implemented in that particular future generation data stream. As a further example, an embodiment of the invention provides for writing, to storage and/or memory, only the differences between data stream generations, and thus avoids the need to rewrite an entire data stream each time a new generation data stream is generated. As a final example, an embodiment of the invention is able to generate data streams at relatively high rates due to the simplicity of the algorithm. Some example rates include, but are not limited to, rates such as 2 GBPS, 10 GBPS, 16 GBPS, or higher.

It should be noted that the foregoing advantageous aspects of various embodiments are presented only by way of example, and various other advantageous aspects of example embodiments of the invention will be apparent from this disclosure. It is further noted that it is not necessary that any embodiment implement or enable any of such advantageous aspects disclosed herein.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may be implemented in connection with the testing, analysis, diagnosis, and evaluation, of systems, software, and components, that individually and/or collectively implement, and/or cause the implementation of, data generation and data management operations. Such data management operations may include, but are not limited to, data read/write/delete operations, data deduplication operations, data backup operations, data restore operations, data cloning operations, data archiving operations, and disaster recovery operations. Thus, while the discussion herein may, in some aspects, be directed to a discussion of data protection environments and operations, the scope of the invention is not so limited. More generally then, the scope of the invention embraces any operating environment in which the disclosed concepts may be useful. In some instances, embodiments of the invention generate data streams for use in testing systems and applications in various environments, one example of which is a data protection environment.

A data protection environment, for example, may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications that generate data that is desired to be protected. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular attention now to FIG. 1, one example of an operating environment is denoted generally at 100. In some embodiments, the operating environment may comprise, consist of, or be a part of, a data protection environment, although none of these arrangements is required. The operating environment can include an enterprise datacenter, or a cloud datacenter, or both. The data protection environment may support various data protection processes, including data replication, data deduplication, cloning, data backup, and data restoration, for example. As used herein, the term backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

In the illustrated example, the operating environment 100 includes a data stream generator 102. In general, the data stream generator 102 operates to generate a data stream, in accordance with various parameters that may be specified by a user by way of a user interface (UI) 102a. More particularly, various parameters of an output data stream created by the data stream generator 102 may be specified, for example, by a user using a user interface (UI) 102a and/or application program interface (API) associated with the data stream generator 102. The UI may be any type of user interface including, but not limited to, a graphical user interface (GUI), or a command line interface (CLI). One example of input that may be provided by way of the UI 102a is block modification information concerning an Nth generation data stream to be created by the data stream generator 102. Another example of a parameter of an output data stream created by the data stream generator 102 that can be specified is the average block size of a dedupe engine. To illustrate, if the dedupe engine works and creates 4K blocks, then a change in 8K of data will result in only one of the 4K blocks changing and the resulting data stream will only have half the desired change rate. Similarly, if the dedupe engine works with 16 KB blocks, a change in 8 KB will cause the entire 16 KB to be treated as changed and, thus, the resulting data stream will have twice the desired change rate. Thus, it is important to specify the average block size for the dedupe engine so that the desired change rate can be appropriately achieved in the data stream.

The data stream generator 102 may be implemented as hardware, software, or a combination of hardware and software. In some embodiments, the data stream generator 102 takes the form of an application that may be hosted on a server, or any other type of host device. The data stream generator 102 may reside at a user premises, at a cloud datacenter, and/or at any other site. In some embodiments, the data stream generator 102 may be an element of another system or device, such as a deduplication server for example. Thus, in such embodiments, an output data stream generated by the data stream generator 102 may then be deduplicated. However, the data stream generator 102 need not be an element of a deduplication server and, in other embodiments, the output data stream generated by the data stream generator 102 may be provided to a deduplication server for deduplication.

In some embodiments, the data stream generator 102 may be similar, or identical, to the 'data stream generator engine' disclosed in one or more of the Related Applications, although the particular configurations in the Related Applications are not necessarily required. One or more data streams generated by the data stream generator 102 may have a compressibility anywhere in the range of about 0% to about 100% and/or may have a commonality with one or more other data streams anywhere in the range of about 0% to about 100%.

In addition, or as an alternative, to user inputs received by way of the UI 102a, the data stream generator 102 may receive an input data stream, and block modification information. In either case, the data stream generator 102 may use any of a variety of inputs as a basis for generating an output data stream. In one particular example, the input data stream to the data stream generator 102 comprises a base data stream, and the block modifications comprise a block modification table for a specific future generation data stream, such as a generation 'N' data stream. In this particular example, the data stream generator 102 creates an Nth generation output data stream.

With continued reference to FIG. 1, the data stream generator 102 may constitute an element of, or communicate with, a test platform 104. The test platform 104 may include, for example, one or more applications 106 and/or one or more hardware devices 108. In general, the data streams generated by the data stream generator 102 may be provided to an application 106 and/or hardware device 108 for testing, analysis, and/or diagnostic, operations. Such data streams may, or may not, be deduplicated before being provided to the test platform 104.

More particularly, the data streams generated by the data stream generator 102 may be provided to, and utilized by, an application 106 and/or hardware device 108. The outputs and/or other responses of the application 106 and/or hardware 108 can then be provided to an evaluation module 110 for analysis and diagnostics. In some embodiments, the evaluation module 110 is an element of the data stream generator 102. In other embodiments however, the evaluation module 110 is separate and distinct from the data stream generator 102.

By generating data streams using inputs from one or more data generators, the data stream generator 102 enables the testing of application 106 and/or hardware 108 so that analyses may be performed, and solutions identified for any problems observed. The flexibility of embodiments with respect to customizing the change rate, and clustering, of data streams generated by the data stream generator 102 enables a wide variety of test and evaluation scenarios to mimic, or replicate, real world conditions. Further information concerning example data generators is disclosed in the Related Applications.

B. Example Host and Server Configurations

Figure 2:
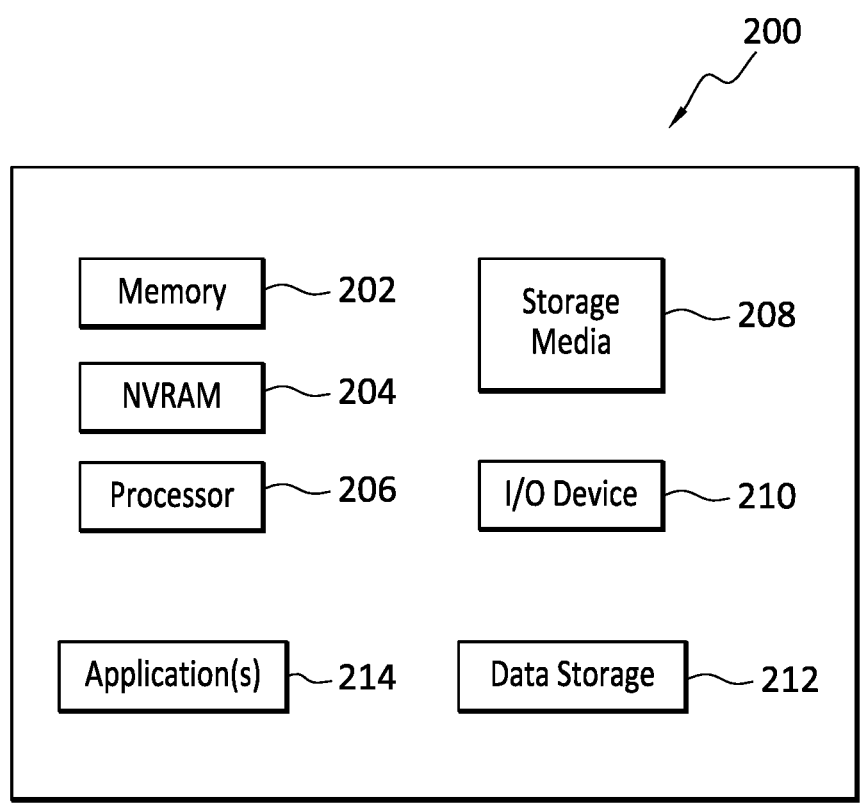
FIG. 2 discloses aspects of an example host configuration.

With reference briefly now to FIG. 2, any one or more of the data stream generator 102, test platform 104, applications 106, hardware 108, evaluation module 110, base stream generator 302, simulation module 306, block modification table 308, and data stream generator 310 can take the form of, or include, or be implemented on, or hosted by, a physical computing device, one example of which is denoted at 200. As well, where any of the aforementioned elements comprise or consist of a virtual machine (VM), that VM may constitute a virtualization of any combination of the physical components disclosed in FIG. 2.

In the example of FIG. 2, the physical computing device 200 includes a memory 202 which can include one, some, or all, of random access memory (RAM), non-volatile random access memory (NVRAM) 204, read-only memory (ROM), and persistent memory, one or more hardware processors 206, non-transitory storage media 208, I/O device 210, and data storage 212. One or more of the memory components 202 of the physical computing device 200 can take the form of solid state device (SSD) storage. As well, one or more applications 214 are provided that comprise executable instructions. Such executable instructions can take various forms including, for example, instructions executable to perform any method or portion thereof disclosed herein, and/or executable by/at any of a storage site, whether on-premises at an enterprise, or a cloud storage site, client, datacenter, backup server, blockchain network, or blockchain network node, to perform functions disclosed herein. As well, such instructions may be executable to perform any of the other operations disclosed herein including, but not limited to, data stream generation, data stream evaluation and analysis, data stream generation, read, write, backup, and restore, operations and/or any other data protection operation, auditing operations, cloud service operations.

C. Data Stream Generation

Figure 3:
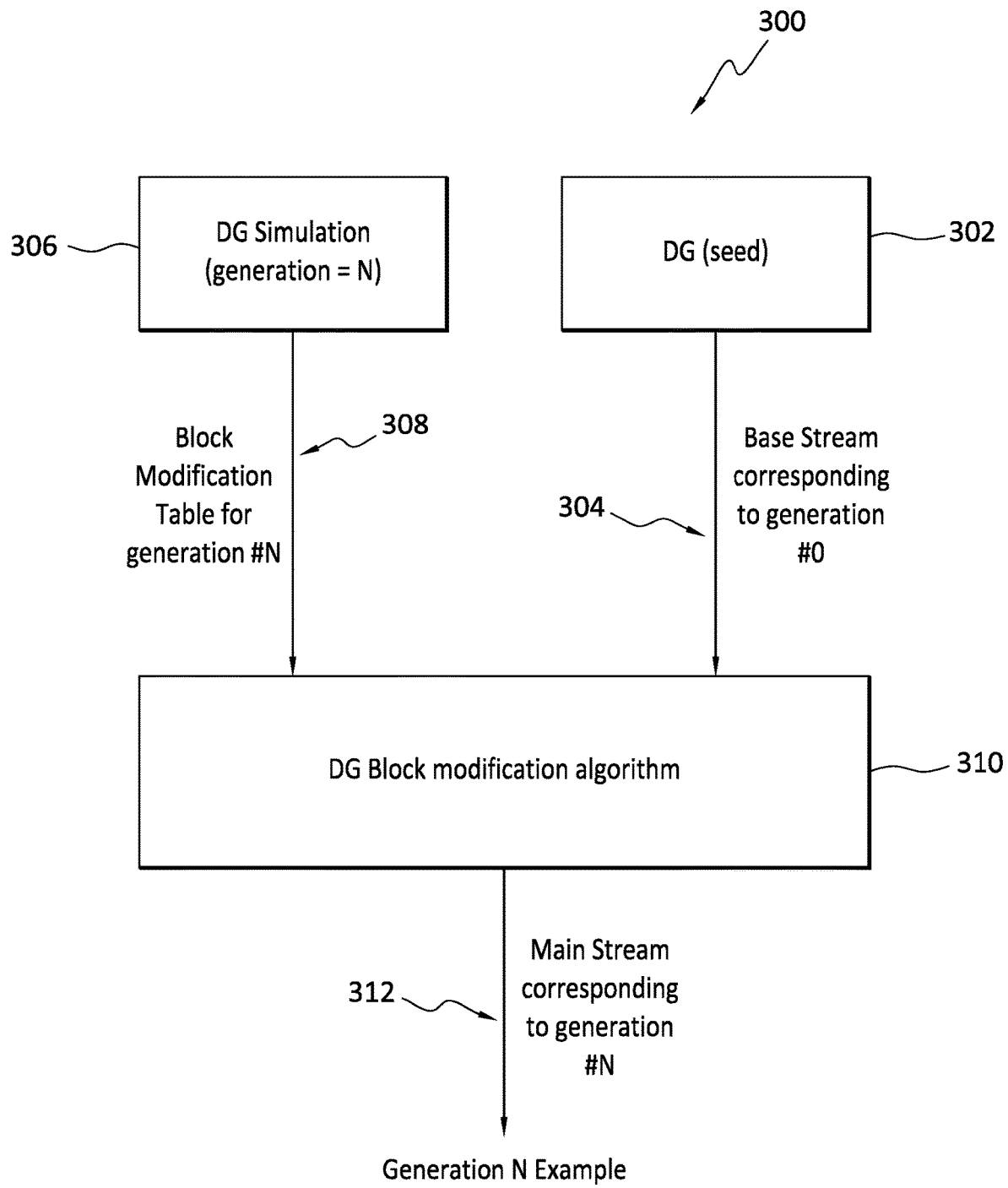
FIG. 3 discloses some general aspects of a configuration in which a data stream is generated based on a block modification table.

Directing attention now to FIG. 3, details are provided concerning systems and processes for generating data streams having a desired change rate and clustering. The data streams may be generated, such as by a data stream generator, based on an input base data stream. In at least some instances, the input base data stream may be unique, non-deduplicatable, and incompressible, although none of these attributes is necessarily required. The input base data stream may be generated at speeds well above 1 gigabyte per second (GBPS).

Data streams generated based on an input base data stream may have a compressibility anywhere in the range of about 0% to about 100% and/or may have a commonality with one or more other data streams anywhere in the range of about 0% to about 100%. As well, any Nth (where N is an integer value equal to or greater than 1) generation of the future data stream may be generated based on a particular base data stream.

In the particular example 300 of FIG. 3, a base stream generator 302, examples of which are disclosed in one or more of the Related Applications, uses a base seed to create a generation #0 data stream 304, that is, a base data stream. In some embodiments, the base stream generated by the base stream generator 302 is unique, non-deduplicatable, and non-compressible.

As well, a simulation module 306 generates a block modification table 308 that, in general, identifies which blocks of a data stream are to be modified for a particular generation 'N' data stream. This may be accomplished, for example, by simulating the blocks that will change in any specific generation, remembering the latest generation that altered that block, and providing that input to the data stream generator 310 to alter the blocks as they are generated by the data stream generator 310. The simulation module 306 operates based on input parameters that specify the particular generation that is to be generated. Such parameters include, but are not limited to, the 'Average Block Size' of a deduplication engine. As indicated in FIG. 3, the data stream generator 310 may comprise, or consist of, a module, algorithm, and/or executable code, that operates to modify blocks as indicated by the block modification table 308. One example implementation of a block modification table is discussed below in connection with FIG. 4. In some embodiments, the simulation module 306 and data stream generator 310 are elements of a common computing entity, while in other embodiments, the simulation module 306 and data stream generator 310 may each be implemented as a separate respective computing entity.

FIG. 3 further indicates that the data stream generator 310 operates to modify one or more blocks of the base data stream to create an 'Nth' generation data stream 312. As discussed in connection with FIG. 1, the Nth generation data stream 312 created by the data stream generator 310 may be provided to various entities, one example of which is a test platform 104. The test platform 104 and/or other entities may use the Nth generation data stream 312 for various purposes including, but not limited to, testing, analysis, and/or diagnostic, operations. These operations may form the basis for implementing one or more corrective, and/or other, actions with regard to the operation of one or more of entities in the test platform 104. As well, the Nth generation data stream and/or one or more other generations of data streams may be retrievably stored, in storage and/or memory for example, for later use.

D. Block Modification Tables

With reference now to FIG. 4, details are provided concerning examples of block modification tables 400 and some associated processes. In the example of FIG. 4, a total of eight block modification tables are indicated, namely, block modification tables 400a, 400b, 400c, 400d, 400e, 400f, 400g, and 400h. In the block modification tables 400a . . . 400h, each entry indicates the status of a particular data block as to the generation to which that data block belongs. That is, each entry in the block modification table 400a . . . 400h remembers the generation to which a specific block belongs to. The block modification tables may also be referred to herein as simulation tables, as the changes among the tables simulate changes occurring in a dataset over time.

Each of the example block modification tables 400a-400h is shown in FIG. 4 as including 100 entries (10 rows×10 columns), but this is only for the purposes of illustration. It is noted that while these tables are shown as 10×10, that notation is employed for the sake of simplicity. The actual table would be 1×100. The number of entries in the block modification tables 400 can be significantly more than 100, but these can also be less than 100 and, correspondingly, the number of rows and columns in a given table can be any numbers. It is noted that there is just one block modification table that has a unique state that represents a specific generation.

To illustrate, for an implementation where the change rate of the data stream is desired to be accurate within 0.1%, 100K entries in one of the block modification tables 400a . . . 400h would suffice. The granularity of the block modification tables 400a . . . 400h can be implemented as necessary. Thus, for example, higher values like 1M or 10M can be utilized when much finer granularity may be needed.

With continued reference to the example of FIG. 4, a total of eight block modification tables, 400a . . . 400h, are indicated, although more, or fewer, block modification tables may be employed in other embodiments. The block modification table 400a is a base block modification table whose generation is N=0. The next six block modification tables 400b . . . 400h each correspond with a particular respective generation. Thus, block modification table 400b corresponds to a generation of N=1, block modification table 400c corresponds to a generation of N=2, block modification table 400d corresponds to a generation of N=3, block modification table 400e corresponds to a generation of N=4, block modification table 400f corresponds to a generation of N=5, block modification table 400g corresponds to a generation of N=6, and block modification table 400h corresponds to a generation of N=7.

In the illustrated example, each new generation corresponds to a particular day. However, that is not required. More generally, any amount of time may elapse between two succeeding generations. Further, the generations need not be equally spaced in time from each other. To illustrate with one example, a first generation may be implemented 3 days before the second generation, and a third generation may follow the second generation by 2 hours. Thus, the arrangement indicated in FIG. 4 is presented only by way of example. It is also noted that there is no requirement for any particular number of generations N in an implementation. Rather, N may be any number 0, where N values greater than zero are integers.

It is noted that the extent to which a dataset changes from one generation to another generation, is constant. For example, as shown in FIG. 4, five (5) of the blocks have changed between Day 1 and Day 2, namely, blocks 13 (value changed from 0 to 1), block 54 (value changed from 0 to 1), block 59 (value changed from 0 to 1), block 83 (value changed from 0 to 1), and block 100 (value changed from 0 to 1). Continuing with this example, it can be seen that the number of blocks that changed between Day 2 and Day 3 is the same as before, that is, five (5) blocks have changed. In particular, the blocks that have changed are block 8 (value changed from 0 to 2), block 39 (value changed from 0 to 2), block 64 (value changed from 0 to 2), block 79 (value changed from 0 to 2), and block 95 (value changed from 0 to 2).

As indicated in the example of FIG. 4, all of the entries may be initialized to 0, although this is not necessarily required. This zero value initialization is reflected in block modification table 400a, where all of the entries have a 0 value. The zero value initialization may correspond to data blocks of a base data stream. When the generation N=1 is needed, simulation logic of the simulation module 306, for example, marks the entries that are to be altered and initializes these from 0 to 1. Thus, and as shown in the example of FIG. 4, blocks 13, 54, 59, 83 and 100 of the block modification table 400b are changed by the simulation module 306 from 0 to 1.

Next, when the generation N=2 is needed, the simulation module 306 first runs the simulation for generation N=1 to create the block modification table 400b, and then the simulation module 306 runs the simulation logic for generation N=2. The simulation for generation N=2 marks the blocks, in the block modification table 400b, whose generation N is to be changed, and then initializes those blocks either from 0 to 2 or from 1 to 2. The result of the execution of the two aforementioned simulations is creation of the block modification table 400c. As shown in FIG. 4, the results of the two simulations are as follows: entry 8 has been initialized from 0 (see block modification table 400a and 400b) to 2; entry 13 with a value of 1 is unchanged (see block modification table 400b); entry 39 has been initialized from 0 (see block modification table 400a and 400b) to 2; entries 54 and 59, each with a value of 1, are unchanged (see block modification table 400b); entry 64 has been initialized from 0 (see block modification table 400a and 400b) to 2; entry 79 has been initialized from 0 (see block modification table 400a and 400b) to 2; entry 83 with a value of 1 is unchanged (see block modification table 400b); entry 95 has been initialized from 0 (see block modification table 400a and 400b) to 2; and, entry 100 with a value of 1 is unchanged (see block modification table 400b).

By initializing, or not initializing, as the case may be, various entries in the block modification table, embodiments of the invention operate to simulate changes occurring between various generations of a dataset. As noted herein, each of the numbers 0, 1, and 2, indicate the particular generation of the block to which the number entry corresponds. Thus, in block modification table 400c, entry 100 is generation N=1, entry 79 is generation N=2, and entry 13 is generation N=1.

As the foregoing examples illustrate, both the speed and rate at which a block is changed can be controlled by embodiments of the invention. For example, block 100 is initialized only once, from 0 to 1 in block modification table 400b. However, block 100 is initialized from 0 to 1 relatively quickly, that is, over the course of a single generation, from N=0 to N=1. As another example, block 93 is initialized relatively slowly, that is, block 93 is not initialized from 0 to 7 until generation N=7. Further, although not specifically indicated in FIG. 4, an entry may be initialized more than once. That is, such initializations indicate that the entry may be associated with one particular generation, such as N=3, but later be initialized again so that the same entry is subsequently associated with a later generation N=5.

With reference to the foregoing examples, and also to FIG. 4, it can be seen that the example tables 400a-400h disclosed in FIG. 4 indicate the status of each block at any generation N. Further, all values of each block will belong to the dataset embraced by generations 0 . . . N.

As the present disclosure indicates, embodiments of the invention provide for a high level of customization with respect to these attributes of a dataset. Further, by varying the size of a particular block modification table, the granularity of changes in the dataset can be readily selected, and adjusted. Finally, the speed with which changes are implemented in the dataset can be adjusted. The datasets thus generated can be used for a variety of purposes relating, for example, to the operation of software such as applications, as well as hardware.

With reference now to the more general case when generation N is needed, the simulation module 306 may first run a simulation for generation N=1 to generation=N−1, and then runs a simulation for generation N, marking any blocks that are to be altered so as to be associated with that generation, and initializing those blocks to N. When this simulation is complete, the block modification table has entries whose values range from 0 to N.

Moreover, the simulation module 306 also acts based on the desired clustering of the changes in the dataset. Thus, the block modification table created by the simulation processes is used as an input to determine if an incoming block to the data stream generator 310 should be altered and, if the block is to be altered, how the alteration should happen so that the altered block in the data stream created by the data stream generator 310 looks like a block from generation X, where X is the value of the entry from the block modification table created as part of the simulation. For example, entry 4 of the block modification table has a value of 0 for generation 4 (see block modification table 400e), but has been initialized to a value of 5 for generation 5 (see block modification table 400f). Thus, the block modification table 400f indicates that the block to which entry 4 corresponds looks like a block from generation 5.

In more detail, embodiments of the simulation module 306 may employ a master mask that embodies, or expresses, the query "what is the value/state of the block in a specific generation?" One example of such a master mask is the block modification table 400a in FIG. 4. Initially, the simulation module 306 prepares the mask to be all zero at the beginning, as noted earlier. See, for example, block modification table 400a of FIG. 3, where all entries are initially 0. The streamer logic of the data stream generator 310 always generates a gen-0 stream, that is, a data stream whose generation is N=0, and as the data stream generator 310 is generating a specific block, the data stream generator 310 checks the mask to see if that particular block needs to be altered and, if so, how that block should be altered.

When generating a genN stream, the initial mask is prepared and then a few of the entries are changed to 1. Then, a few of the entries are changed to 2, and so on, until generation N. This process always changes from generation M to N, where N is always higher than M. At a very high value N for the generation, there may not be any blocks left as 0, or from lower generations. Thus, all the entries in a block modification table N may have non-zero values. This progression of reductions in the number of non-zero entries can be seen in FIG. 4, where the number of non-zero entry values increases from zero at the mask level (block modification table 400a) to 35 non-zero entry values where generation N=7 (block modification table 400h).

The number of entries that are changed between generations, and/or over the span of multiple generations, depends on the desired change rate. Entries that get changed depend on the distribution type, such as uniform, random, normal, or cluster, for example. Now, when the gen-X stream is needed, the gen-N stream is still generated, but a lookup is performed against the mask, that is, the block modification table, for that generation. If any value in the mask is 0, the corresponding block stays at gen-0. If any value in the mask is non-zero, the corresponding block is altered/corrupted by the data stream generator 310 to make that block look like a block for gen-X, where X is the value of the entry. As these examples illustrate, the masks, or block modification tables, can be used to dictate and define the particular changes made to a simulated dataset, as well as the rate at which those changes are implemented.

With continued reference to FIG. 4, at least some embodiments of the invention provide for morphing a dataset from generation N-1 to generation N, without the need to generate the entire generation N-1 data stream or the generation N data stream. In one example, a simulated block modification table is created by the simulation module 306 for generation N. Only the entries that have recorded the value of "N" are the ones that are different between the previous generation (N-1) and the current desired generation (N). If it is known that the generation N-1 exists, the data stream generator 310, using the mask or block modification table, can simply go directly to the blocks that need to be altered, as indicated by the mask, and perform the change to generate a dataset 312 that corresponds to the generation N. Similar logic can be applied to morph the dataset backwards from generation N to generation N-1. Advantageously, none of these processes requires a full generation of the streams at generation N-1 and at generation N.

As noted elsewhere herein, block modification tables can be of a variety of different sizes. The particular size of a block modification table may be based on one or more of a variety of considerations including, but not limited to, the accuracy needed in a simulated data stream, and the manner in which changes to one or more generations of a data stream are injected. The following examples are illustrative.

For example, a block modification table used for modification of a base data stream can be as short as 100 entries if accuracy is needed within 1%. As another example, the block modification table would have to have 1000 entries if the accuracy needed is 0.1%. In many cases, 0.1% accuracy may be sufficient. However, having a block modification table with 1000 entries may not be sufficient, depending upon the manner in which changes are to be made to a data stream. For example, if there is a need to provide change clustering and randomness in a data stream, a block modification table with 1000 entries may not be large enough. Thus, in cases like these, a relatively larger block modification table may be needed, such as a block modification table with 100K, or more, entries.

To illustrate further, if each entry in a block modification table represents a block of 8 KB data, then with a table that has 100K entries, the sequence of change is repeated only after 800 MB. Thus, if an 8K block at 10 MB is changed in a specific generation, then a block at 810 MB, 1610 MB, and so on, will also change.

While block modification tables may be relatively large in terms of the number of entries they contain, the block modification tables may be generated relatively quickly and may consume a relatively small amount of storage space. For example, each entry can be as short as 1 byte long if only a maximum of 255 generations are needed. Generally, there is no practical need for a generation beyond 64K generations, and a 2 byte value will adequately cover that use case. As such, the storage space requirement for the block modification table may be quite low. For example, a block modification table with 1M entries may require only 2 MB of storage space. As well, even for a block modification table with 1M entries, the time to generate the block modification table for generation #1 may be quite small since a uniform distribution probability generator only needs to be run 1M times, and the time that it takes to generate the table for generation N linearly increases (N times each generation). That would be needed if the data stream generator 310 needs to generate generation N of the stream. On the other hand, if the goal is simply to find the blocks that need to be initialized at generation N, then the generation N algorithm can be directly run to morph generation N-1 to generation N, as disclosed elsewhere herein. As well, the block generation table code can be 'smart' and size the entries depending on the generation that is needed. To illustrate, if the required generation is 255 or lower, the block generation table code will size the table with one byte long entries. As a further example, when the required generation is 65535 or lower, the block generation code will size the table with two bytes long entries and can continue this logic when higher generations are needed.

E. Aspects of Some Example Methods

Figure 5:
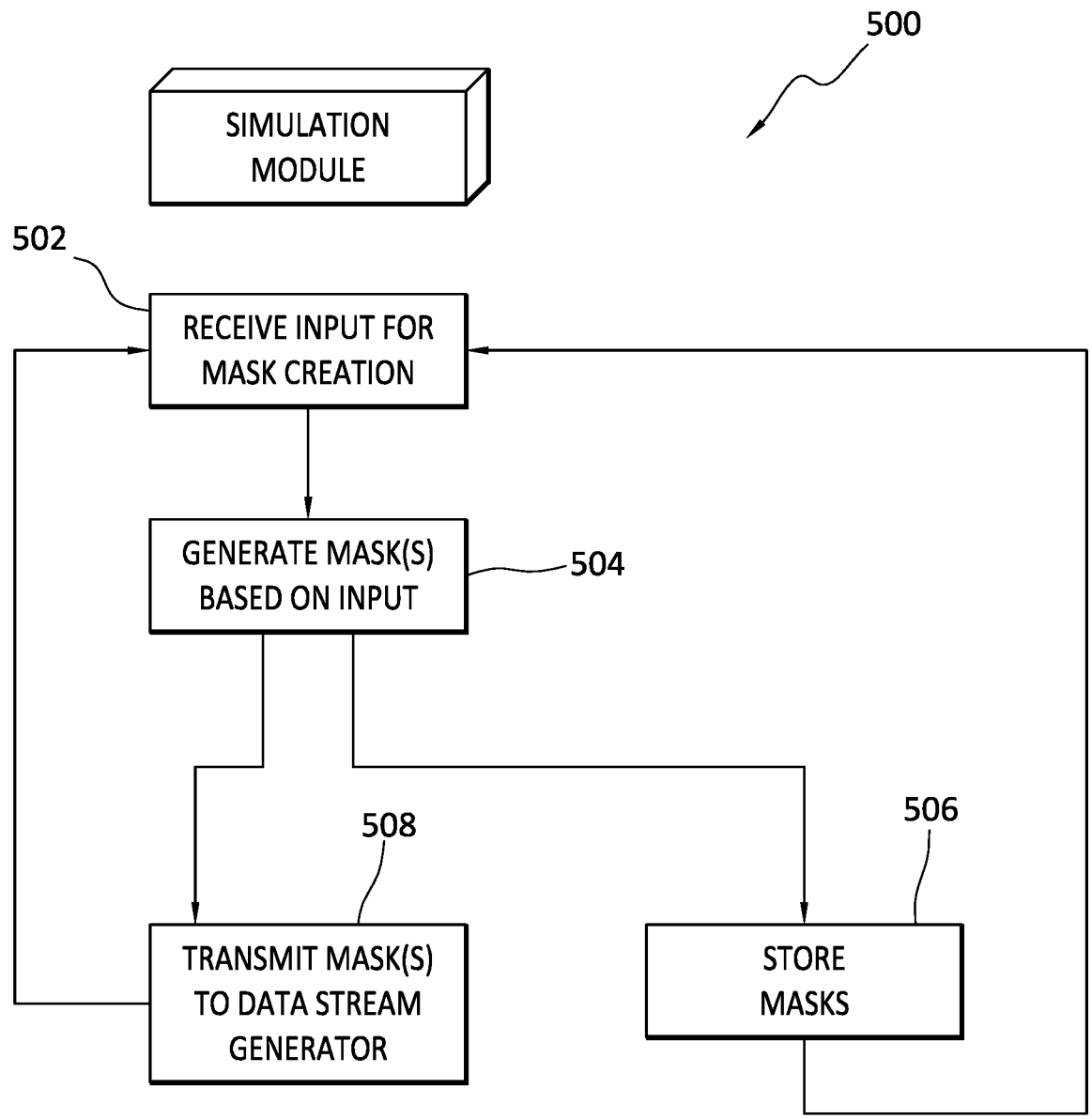
FIG. 5 is a flow diagram that discloses some general aspects of a method for creating a block modification table.

With reference now to FIG. 5, details are provided concerning aspects of example methods for creating a block modification table, which may also be referred to herein as a mask. One example of such a method is denoted generally at 500. The method 500 may be performed by and/or at the direction of a simulation module 306, which may comprise, or consist of, simulation logic.

The method 500 may begin at 502 when a simulation module, for example, receives input concerning one or more masks that is/are to be generated by the simulation module. The input, which may be provided by a user, or retrieved from storage, for example, may include values for a variety of parameters. The parameters may include, but are not limited to: the number of entries to be included in one or more masks; the number N of generations for which masks are to be generated; the rate at which changes will be implemented to the mask, or masks, that will be generated; the size of each entry in the mask(s); and, the type(s) of changes, such as random or grouped, for example, expected to be made in one or more subsequent generations of the mask.

After receipt 502 of the input, the simulation module then generates 504 a mask, or block modification table, based on the input received, where each entry of the mask corresponds to a particular data block to be included in a simulated data stream. If the caller provides a mask as gen-X and wants a mask for gen-N, where X can be higher or lower than N, the logic can morph 504 the mask backward or forward one generation at a time. When no mask is provided, the logic starts 504 with gen-0 mask as a start default. One example of a set of masks generated 504 by a simulation module is disclosed in FIG. 4.

As also indicated in FIG. 4, generation of the masks 504 includes initialization of one or more entries in each of the masks to have a value that corresponds with the generation of the data block to which that entry corresponds. Thus, for example, a data block to be changed in the seventh generation of a data stream will have a corresponding entry of 7, which will appear in the mask that corresponds to that seventh generation. As discussed elsewhere herein, this entry of 7 provides an indication to a data stream generator that the corresponding block is to be changed in the seventh generation data stream generated by the data stream generator.

When the mask(s) have been created 504, they may be retrievably stored 506 in storage and/or memory. The stored masks may be accessible by a data stream generator. Additionally, or alternatively, the created masks may be pushed 508 by the simulation module to the data stream generator.

The method 500 may be performed recursively for each of a plurality of masks. Alternatively, the method 500 may be performed such that N masks needed for a particular simulated data stream are all created at the same time.

Figure 6:
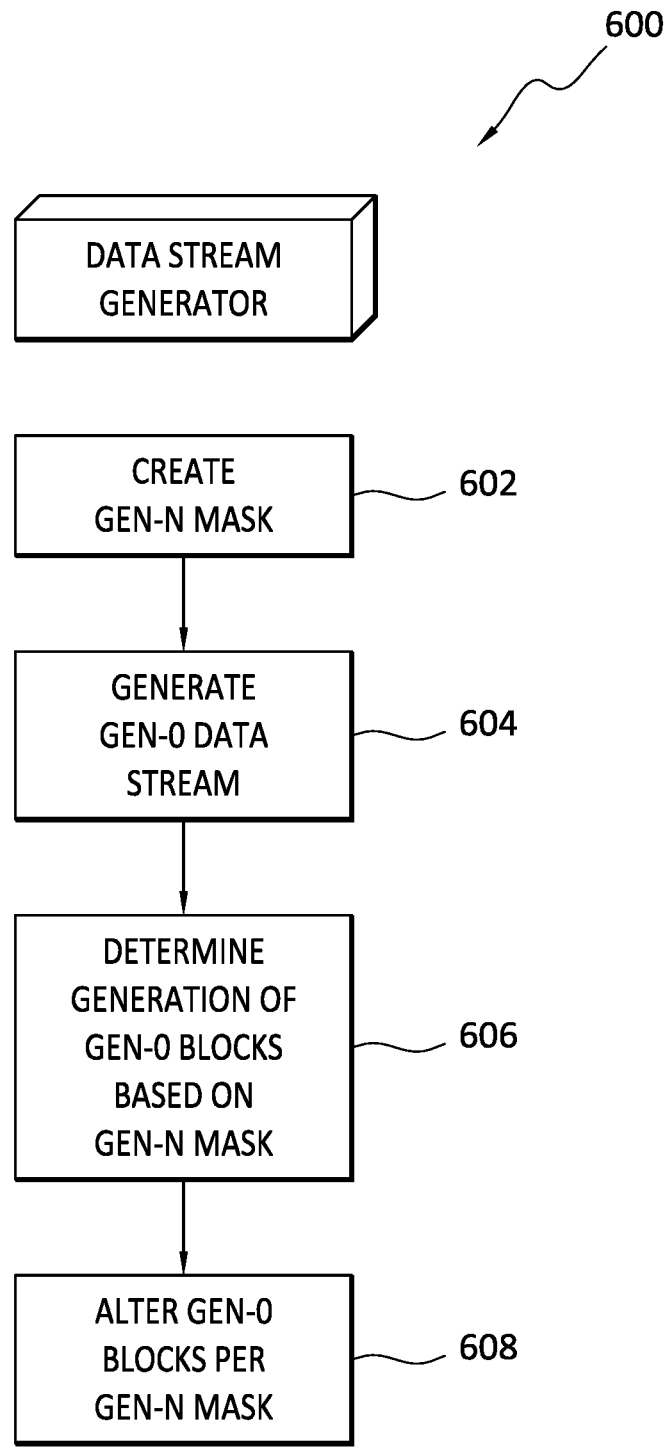
FIG. 6 is a flow diagram that discloses some general aspects of a method for creating a data stream based on a block modification table.

Turning now to FIG. 6, details are provided concerning aspects of example methods for generating an Nth generation data stream. One example of such a method is denoted generally at 600. The method 600 may be performed by and/or at the direction of a data stream generator 310.

The method 600 may begin when a data stream generator creates 602, or otherwise accesses, a gen-N mask. In some embodiments, the gen-N mask can be received by the data stream generator from an external entity, that is, an entity other than the data stream generator, such as a customer, or simulation module, for example. As well, the gen-N mask may be created by the simulation module.

After the gen-N mask has been received 602, the gen-0 data stream, that is, the data stream for which N=0, may be generated 604 by the data stream generator. In some embodiments, the gen-0 data stream can be generated prior to receipt or creation of the gen-N mask.

Next, the generation of each of the blocks in the gen-0 data stream is determined 606. In particular, the gen-N mask is examined to identify the respective generation that has been specified for each of the blocks in the gen-0 data stream.

When the respective generation of the blocks of the gen-0 data stream is determined 606, the blocks of the gen-0 data stream are then altered 608 as specified by the gen-N mask. The resulting, altered, data stream is the gen-N data stream.

It is noted, with respect to the masks disclosed herein, examples of which are discussed in connection with FIG. 6, as well as FIGS. 7a and 7b, that in general, a single mask conveys all the information needed to generate a data stream for generation N. All other masks, that is the masks from 0 to N−1, are transient. There is only one copy of the data stream that starts with the base mask and the base mask sequentially becomes respective masks for gen-1/gen-2/ . . . and, finally, gen-N.

Figure 7A:
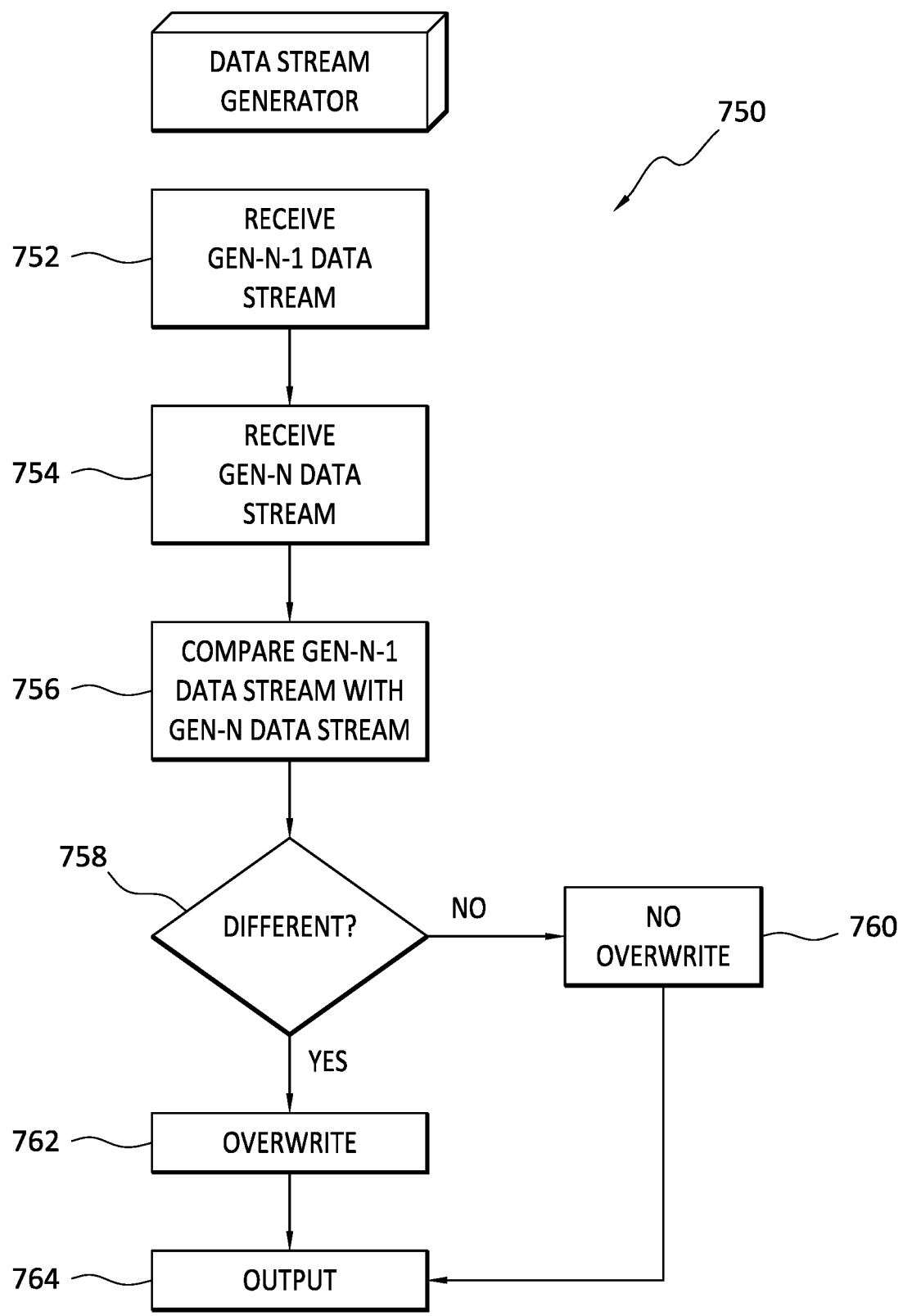
FIG. 7a is a flow diagram disclosing aspects of an example method for morphing one generation of a data stream to another generation of a data stream.
Figure 7B:
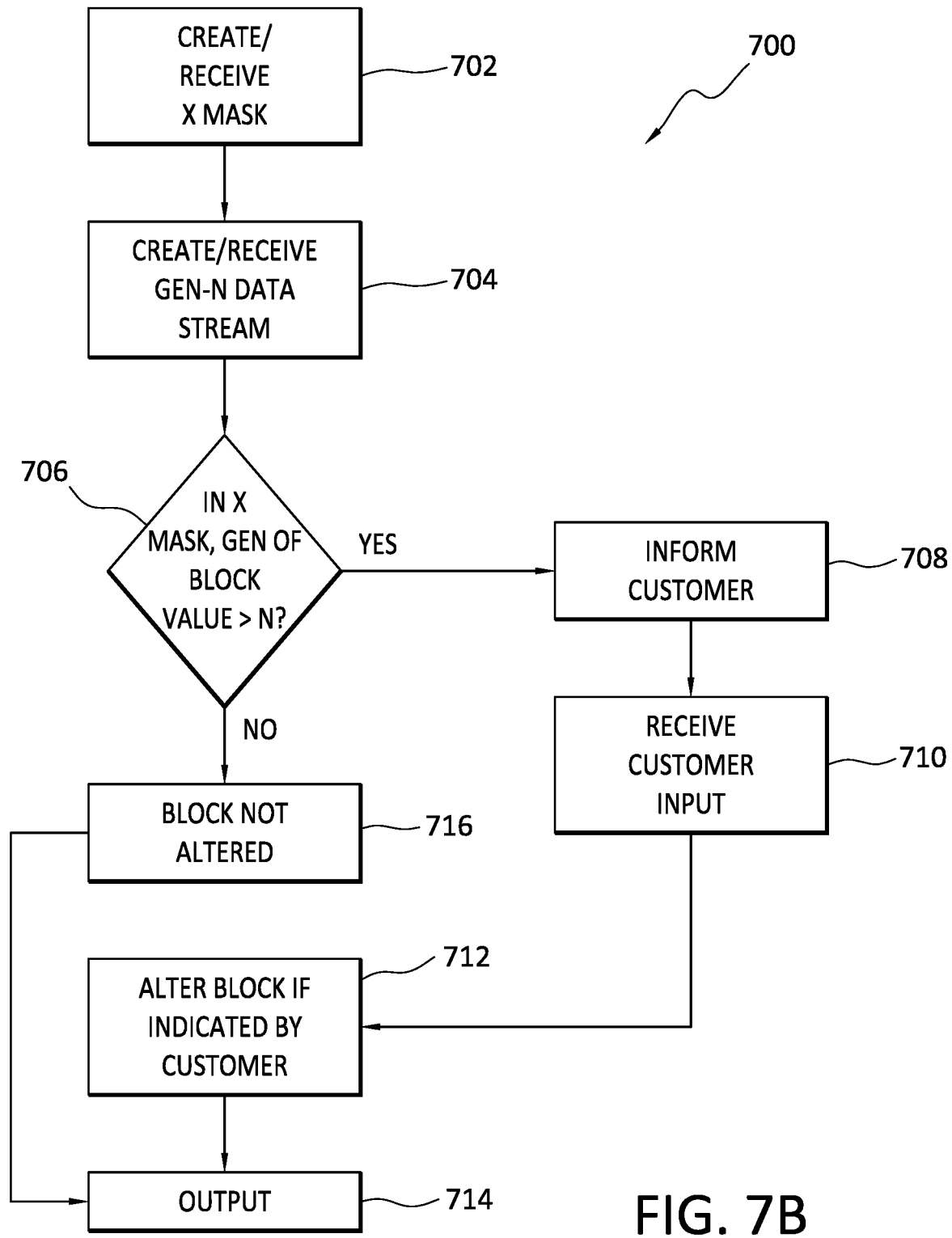
FIG. 7b is a flow diagram disclosing aspects of another example method for morphing one generation of a data stream to another generation of a data stream.

With reference now to FIGS. 7a and 7b, details are provided concerning some different ways in which a data stream can be morphed from one generation to another. In general, and as indicated in FIG. 7b, a gen-N(N≥0) data stream can be morphed forward to a gen-X data stream, where gen-X=gen-N+a (a≥1). That is, a data stream can be morphed forward a single generation, or multiple generations. Moreover, and as discussed below, morphing of a data stream can proceed in reverse as well. As with forward morphing, a data stream can be morphed in reverse to the immediately preceding generation, or to any preceding generation.

Turning now to FIG. 7a, an example method 750 is disclosed that begins when a gen-N−1 data stream is received 752. As well, a gen-N data stream is received 754. These data streams can, alternatively, be received in the reverse order, or at about the same time.

Once the gen-N−1 and gen-N data streams have been received, the respective blocks of the two data streams are compared 756. If the comparison 756 reveals 758 that the generation of a block has not changed from the gen-N−1 data stream to the gen-N data stream, then that block is not overwritten 760.

On the other hand, the comparison 756 reveals 758 that the generation of a block has changed from the gen-N−1 data stream to the gen-N data stream, then that block is overwritten 762 when the gen-N data is available. The new blocks and the unaltered blocks are then output 764 as the gen-N data stream.

With reference now to FIG. 7b, an example method 700 is disclosed that requires only the use of a gen-X mask to forward morph a gen-N(N≥0) data stream to a gen-X data stream, where gen-X=gen-N+a (a≥1). The example method 700 begins when a gen-X mask is created, or received, 702. Next, the gen-N data stream is created, or received, 704. As the blocks from the gen-N data stream come in, the final generation of each of those blocks is determined 706, based on reference to the gen-X mask.

In particular, a determination 706 is made, for each incoming block, whether the generation value of that block in the X mask is greater than generation N. If so, then it can be concluded that the block should be changed. On the other hand, if the generation value in the X mask is N, the corresponding block does not need to be changed. As used herein, "generation value" refers to the generation of a particular block of a particular data stream. Thus, for example, a gen-3 mask entry having a generation value of 2 means that the block associated with that entry was last modified in the second generation data stream.

To further illustrate, reference is made again to FIG. 4. In this illustrative example, it is assumed that the gen-N data stream is the gen-4 data stream (i.e., N=4, day 5), and the gen-X data stream is the gen-7 data stream (i.e., X=7, day 8), and that the gen-4 data stream is to be morphed forward to the gen-7 data stream. This forward morphing can be accomplished solely with resort to the X mask, that is, the mask that corresponds to the generation of the data stream desired to be generated. No other masks are needed or consulted. It can be seen in the X mask that, for example, entry 1 has a generation value of 0. That is, the generation of the block associated with entry 1 is still at 0 (i.e., the gen-0 value) and has not changed between the gen-N data stream and the gen-X data stream. Thus, it can be seen that with respect to entry 1, the generation value 0 is N (N=4 in this example) and, as such, no change is needed to the data block associated with that entry. On the other hand, it can also be seen in the X mask that entry 4 has a generation value of 5. In this case, the generation value 5 is >N (N=4), which means that the block associated with that entry has been changed subsequent to creation of the gen-4 data stream. As such, the block associated with entry 5 must be changed as part of the generation of the gen-7 data stream.

With continued reference now to FIG. 7b, if it is determined 706 that the generation value is >N, the method advances to 708 where the customer is informed that the next change to that block has arrived, and the customer is also informed how long the change will be present. The caller can skip anything up to the skipped offsets and apply the change, that is, alter the block of the gen-N data stream to the generation indicated for that block in the X mask. Based on input received 710 from the customer, the block is altered 712 if the customer so indicates. For example, assuming that the block is 8K in size, 4/8 bytes of data in this block are overwritten to instrument the corruption, that is, the change in generation. Alternatively, if the customer indicates that the block is not to be altered for some reason, the block remains at whatever generation value it was at in the gen-N data stream.

Similarly, and returning briefly to the determination 706, if it is determined, using the gen-X mask, that the generation value of a block is N, then that block remains at whatever generation it was in the gen-N data stream. That is, the block is not altered 716. The altered blocks+unaltered data blocks are then output 714 as the gen-X data stream.

In this way, the method 700 uses only a single mask to forward morph a data stream from gen-N to gen-X. As noted above, it will be appreciated that the method 700 need not necessarily be employed with consecutive generations of the data stream.

Figure 7C:
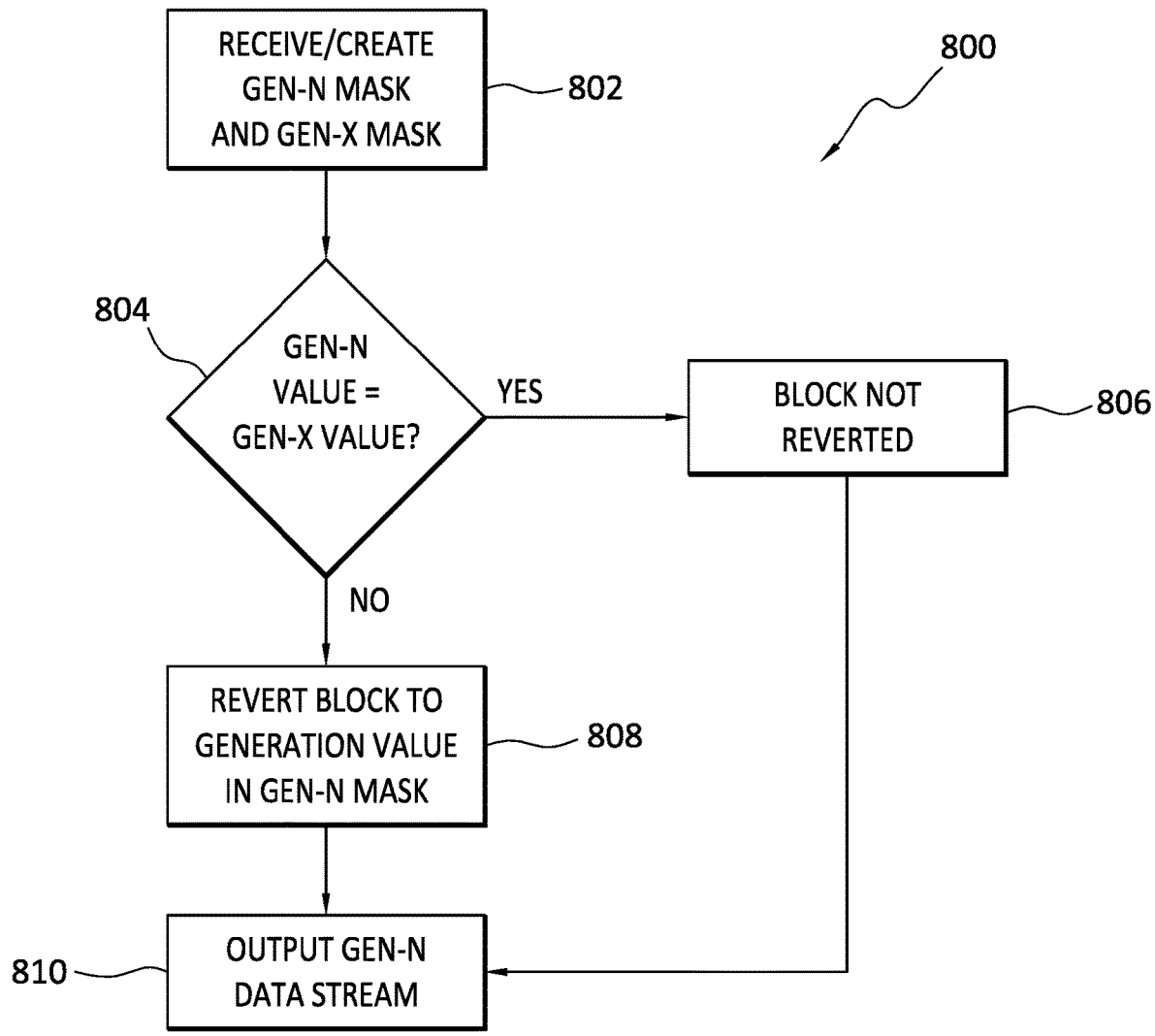
FIG. 7c is a flow diagram disclosing aspects of an example method for reverse morphing one generation of a data stream to another generation of a data stream.

With reference now to FIG. 7c, and as noted elsewhere herein, a given data stream can be reverse morphed to any generation preceding data stream. Before addressing the specific example of FIG. 7c, the following discussion considers some examples of reverse morphing processes that can reverse morph a data stream in reverse a single generation, or multiple generations. The following discussion also addresses another example of forward morphing, for comparison purposes.

It will be assumed, for the sake of this discussion, that a mask includes 7 generations, as well as gen-0. The respective generations each have 5 values: 00000 (gen-0), 00100 (gen-1), 00120 (gen-2), 30120 (gen-3), 30140 (gen-4), 35140 (gen-5), 35146 (gen-6), and 35746 (gen-7). These mask values correspond to the respective mask entries M0, M1, M2, M2, M3, M4, M5, M6, and M7 for G0 (gen-0), G1 (gen-1), G2 (gen-2), G3 (gen-3), G4 (gen-4), G5 (gen-5), G6 (gen-6), and G7 (gen-7).

Suppose now that the caller or customer is at G2, where the 5 mask values are 00120, but wants to morph forward to G4 (generation 4), where the 5 mask values are 30140. In this example, it will not suffice to simply check for the presence of the value 4 in G4. Rather, a check must also be performed for the presence of the value 3 in G4. That is, all values >2 must be checked because it must be determined whether or not any change occurred between G2 and G3, and that can only be done by checking for the value 3 in G4. Thus, the blocks that respectively correspond to the entry values 3 and 4 in G4 must be changed in order for the gen-2 data stream to be morphed to the gen-4 data stream.

Reverse morphing of a data stream generation across multiple generations is also possible. For example, suppose that the caller is at G5 (generation 5), with the mask values 35140, and wants to revert the data stream to G2 (generation 2), with the mask values 00120. In this case, it will not suffice to simply check for the values 5 in G5. Rather, it is also necessary to check for the G3 and G4 values. It can be seen that G5 has the value 3, and at that location there is 0 in G2, so the block to which that value corresponds is reverted to gen-0. The next entry in the G5 mask is a 5 and the corresponding entry in the G2 mask has a 0, so the block corresponding to that entry is reverted to gen-0. In the next entry of the G5 mask, the value is a 1, so no change to the corresponding block is needed because that block has not changed since gen-1, which precedes gen-2. In the next (fourth) entry of the G5 mask, the value is 4, while the corresponding value in the G2 mask is 2, so the corresponding block is reverted to gen-2. In the fifth, and final, entry of the G5 mask, the value is 0, so no change is required to the corresponding block.

With the foregoing illustrative examples in view, details are now provided concerning an example method for reverse morphing a data stream from one generation to another, where the respective generations of the two data streams may be consecutive, or non-consecutive. In FIG. 7c, one example of a reverse morphing process is denoted generally at 800. The method 800 involves the use of two masks, namely, a mask for gen-X, that is, the data stream that is to be morphed in reverse, and a mask for gen-N, that is, the target generation data stream. Put another way, the method 800 serves to morph the gen-X data stream back to gen-N, where X−N≥1.

The method 800 can begin at 802 where the gen-N and gen-X masks are created, or received. Next, the generation values in each entry of the gen-X mask are compared 804 with the generation values in the corresponding entries of the gen-N mask.

If it is determined 804 that, for example, a generation value at entry 1 in the gen-X mask is '6,' which is the same as the generation value at entry 1 in the gen-N mask, then the corresponding data block is not modified 806. On the other hand, if it is determined 804 that, for example, a generation value for a block at entry 5 in the gen-X mask is '4' and the generation value for that block at entry 5 in the gen-N mask is '2,' then that data block is reverted 808 from generation 4 back to generation 2, as indicated by the generation value in the gen-N mask.

Finally, when all the generation values of the gen-X and gen-N masks have been compared, and one or more blocks reverted as necessary, the gen-N data stream is then output 810. In this way, a generation of a data stream can be reverted to any prior generation by comparing the two respective masks associated with those data streams. Thus, in the example of FIG. 7c, the corresponding blocks are reverted back from their gen-X state to their gen-N state. As is evident from this discussion, reverse morphing requires use of both the mask X and mask N, since the state, or generation, of a block in both generations must be known, while in comparison, forward morphing (FIG. 7b) requires only the use of the mask X, since it is only necessary to know whether or not a block value is >N.

With reference to the methods 600, 700, 750, and 800, the data stream can be output, for example, to one or more computing entities. As noted herein, one example of such an entity is a test environment, although the scope of the invention is not so limited. Additionally, or alternatively, the output data stream may be stored in storage and/or memory.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a generation 0 data stream;
   creating and/or receiving a mask that comprises a plurality of entries, wherein each mask entry of the plurality of entries corresponds to a respective block of the generation 0 data stream, and wherein each mask entry of the plurality of entries indicates a value n, where $0 \leq n \leq$ desired generation N data stream;
   identifying, in the mask, all non-zero mask entries;
   locating, in the generation 0 data stream, the blocks to which the non-zero mask entries respectively correspond; and
   based on the value n, modifying one or more blocks of the generation 0 data stream to create a generation N data stream at a relatively high rate using a data stream generator in accordance with one or more parameters specified by a user via a user interface.

2. The method as recited in claim 1, wherein the value n corresponds to a particular generation of one of the one or more blocks of the generation 0 data stream.

3. The method as recited in claim 1, wherein the mask comprises a block modification table.

4. The method as recited in claim 1, wherein the method is performed by the data stream generator.

5. The method as recited in claim 1, further comprising morphing the generation N data stream by multiple generations either backward to a generation N−X data stream, or forward to a generation N+X data stream, where X is $\geq 1$.

6. The method as recited in claim 1, further comprising creating a generation N−1 data stream using another mask at a relatively high rate using the data stream generator in accordance with the one or more parameters specified by the user via the user interface.

7. The method as recited in claim 6, wherein the generation N−1 data stream is created before the generation N data stream.

8. The method as recited in claim 7, further comprising ascertaining any differences between the generation N−1 data stream and the generation N data stream.

9. The method as recited in claim 8, wherein ascertaining any differences between the generation N−1 data stream and the generation N data stream comprises comparing the mask with the another mask.

10. The method as recited in claim 1, further comprising morphing the generation N data stream either backward to a generation N−1 data stream, or forward to a generation N+1 data stream.

11. A non-transitory storage medium having stored therein instructions which are executable by one or more hardware processors to perform operations comprising:
    receiving a generation 0 data stream;
    creating and/or receiving a mask that comprises a plurality of entries, wherein each mask entry of the plurality of entries corresponds to a respective block of the generation 0 data stream, and wherein each mask entry of the plurality of entries indicates a value n, where $0 \leq n \leq$ desired generation N data stream;
    identifying, in the mask, all non-zero mask entries;
    locating, in the generation 0 data stream, the blocks to which the non-zero mask entries respectively correspond; and
    based on the value n, modifying one or more blocks of the generation 0 data stream to create a generation N data stream at a relatively high rate using a data stream generator in accordance with one or more parameters specified by a user via a user interface.

12. The non-transitory storage medium as recited in claim 11, wherein the value n corresponds to a particular generation of one of the one or more blocks of the generation 0 data stream.

13. The non-transitory storage medium as recited in claim 11, wherein the mask comprises a block modification table.

14. The non-transitory storage medium as recited in claim 11, wherein the operations are performed by the data stream generator.

15. The non-transitory storage medium as recited in claim 11, wherein the operations further comprise morphing the generation N data stream by multiple generations either backward to a generation N−X data stream, or forward to a generation N+X data stream, where X is ≥1.

16. The non-transitory storage medium as recited in claim 11, wherein the operations further comprise creating a generation N−1 data stream using another mask at a relatively high rate using the data stream generator in accordance with the one or more parameters specified by the user via the user interface.

17. The non-transitory storage medium as recited in claim 16, wherein the generation N−1 data stream is created before the generation N data stream.

18. The non-transitory storage medium as recited in claim 17, wherein the operations further comprise ascertaining any differences between the generation N−1 data stream and the generation N data stream.

19. The non-transitory storage medium as recited in claim 18, wherein ascertaining any differences between the generation N−1 data stream and the generation N data stream comprises comparing the mask with the another mask.

20. The non-transitory storage medium as recited in claim 11, wherein the operations further comprise morphing the generation N data stream either backward to a generation N−1 data stream, or forward to a generation N+1 data stream.

* * * * *